Feb. 17, 1959 G. W. LAMPMAN ET AL 2,873,962
LEAF SPRING ASSEMBLY
Filed April 25, 1956

INVENTORS
George W. Lampman,
Clayton B. Leach &
BY Lloyd R. Vivian Jr.
Paul Fitzpatrick
ATTORNEY

United States Patent Office 2,873,962
Patented Feb. 17, 1959

2,873,962
LEAF SPRING ASSEMBLY

George W. Lampman and Clayton B. Leach, Pontiac, and Lloyd R. Vivian, Jr., Birmingham, Mich., assignors to General Motors Corporation, Detroit, Mich., a corporation of Delaware Application April 25, 1956, Serial No. 580,637

3 Claims. (Cl. 267—49)

This invention relates to leaf spring assemblies and more particularly, although not exclusively, to leaf spring assemblies of the type commonly employed in automotive suspension.

Rear wheel suspension for automotive vehicles has long been accomplished predominantly by means of leaf spring assemblies. Numerous advantages result therefrom which are so well known as to require no explanation. However, conventional leaf spring assemblies exhibit certain undesirable characteristics, such as substantial transmission of road noise and a tendency to develop squeaks resulting from frictional drag between the associated leaves. Various solutions to these problems have been proposed in the past. For example, to prevent squeaking, it was formerly common to provide means for periodic injection of lubricants between the frictionally engaging surfaces. However, in practice this method proved somewhat ineffective due to difficulties in retaining lubricant between the leaves. Various forms of leaf spring inserts have also been proposed to eliminate squeaking and to some extent also effect damping of road noises. In some cases these inserts took the form of full length liners of natural rubber, impregnated fibers, and the like. However, in practice natural rubber proved unsatisfactory due to its tendency to develop compression set, rapid deterioration and other shortcomings. In other cases, it has been proposed to use synthetic rubber inserts in the form of buttons, pads, and the like. However, these also proved unsatisfactory since the materials contained a residue of waxy compounds employed in processing the rubber. These compounds tended to migrate to the surface of the inserts and subsequently permitted sufficient relative movement between the inserts and its adjacent spring to generate squeaks.

An object of the present invention is to provide an improved leaf spring assembly.

Another object is to provide a leaf spring assembly wherein the spring leaves have interposed therebetween full length resilient liners possessing optimum damping characteristics.

Another object is to provide a leaf spring assembly of the type described wherein the liners are relatively impervious to deterioration due to weather, oils, greases, etc.

A further object is to provide, in a spring assembly of the type described, a liner exhibiting substantially uniform performance characteristics throughout the maximum temperature range normally encountered in automotive vehicles.

Still another object is to provide, in a spring assembly of the type described, a resilient liner possessing high resistance to compression set.

Still a further object is to provide, in a spring assembly of the type described, a resilient liner which is free of waxy compounds.

Yet another object is to provide a leaf spring assembly wherein the resilient liners therein are uniform in cross section from end to end in order to enable economic production and facilitate rapid assembly.

These and other objects and advantages of the invention will become more fully apparent as reference is had to the accompanying specification and drawings wherein.

Figure 1:
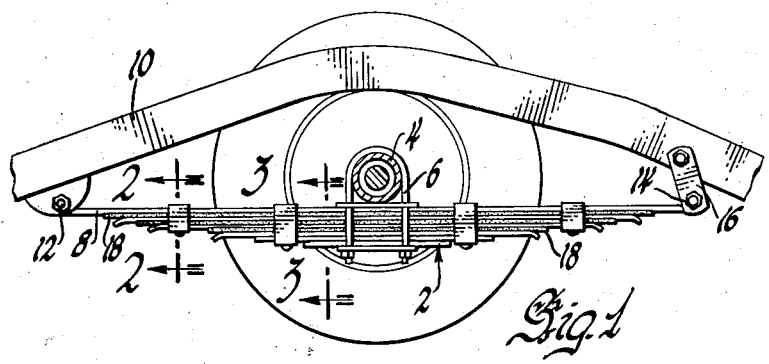
Fig. 1 is a fragmentary side elevational view of a vehicle rear wheel suspension including a leaf spring assembly embodying the invention.
Figure 2:
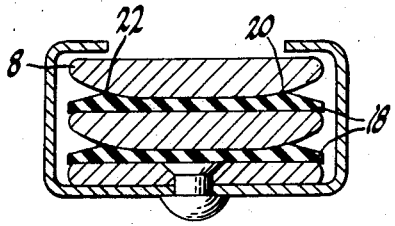
Fig. 2 is a vertical sectional view looking in the direction of arrows 2—2 of Fig. 1.
Figure 3:
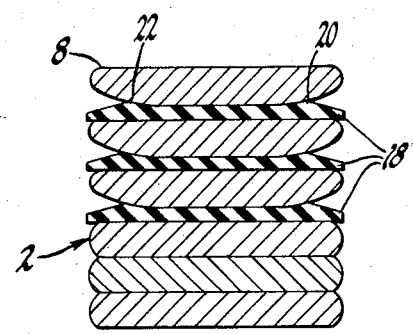
Fig. 3 is a vertical sectional view looking in the direction of arrows 3—3 of Fig. 1.
Figure 4:
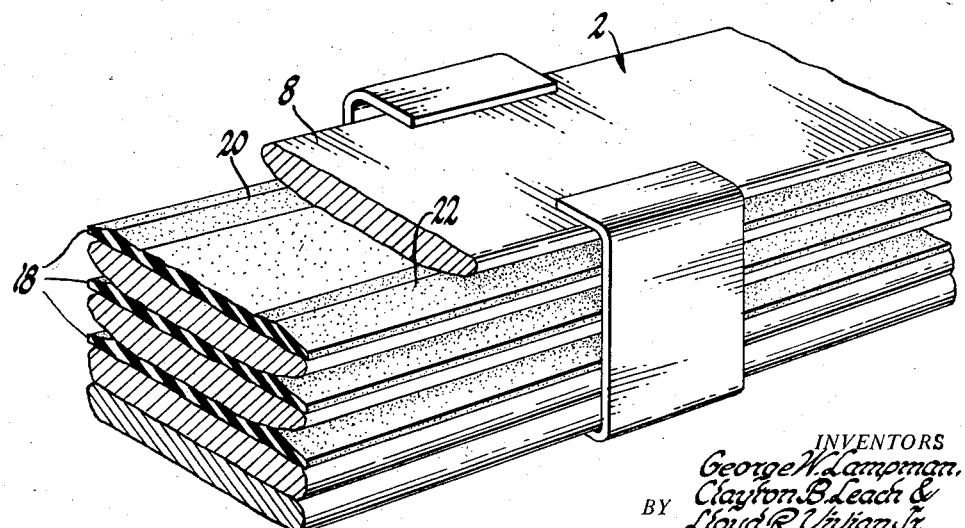
Fig. 4 is a fragmentary perspective view illustrating the relationship of the spring leaves and associated liners.

Referring now to the drawings and particularly Fig. 1, there is illustrated a leaf spring assembly 2 which is connected at its midportion to a rear axle housing 4 by means of a U-bolt 6. At its forward end, the upper or main leaf 8 of assembly 2 is pivotally connected to the vehicle frame 10 by a pivot member 12, while the rear end of leaf 8 is pivotally connected at 14 to a shackle 16, which in turn is pivotally connected to frame 10. In the illustrated embodiment, assembly 2 comprises six vertically stacked spring leaves and three resilient liners, the latter being disposed between the upper four leaves of the six leaf assembly. It will be understood, however, that the invention is not limited to an assembly composed of any particular number of leaves nor to a specific number or location of resilient liners. As seen in Fig. 1, each liner 18 extends substantially the full length of the lower adjacent spring leaf. In Figs. 2, 3 and 4, it will be observed that each liner 18 is provided with parallel longitudinally extending marginal ribs 20 and 22, the profiles of which are adapted to conform to the parabolic profile of the lower surface of the upwardly adjacent leaf. It will also be seen that the liners are formed to a width equal to the overall width of the spring leaves so as to permit rapid alignment of the organization, during assembly.

In accordance with one feature of the present invention, liners 18 are extruded Butyl rubber members of uniform cross section. Because of the uniform cross section employed, liners 18 are easily and economically produced by continuous extrusion, the individual liners being dissimilar in length only. It has been found that Butyl rubber possesses damping characteristics superior to those exhibited by any natural rubber compounds and the majority, if not all, of presently known synthetic rubbers, for which reason it is ideally suited for use in spring assemblies. Butyl rubber also exhibits extraordinary resistance to deterioration from exposure to weather, oils, greases, etc. to which such liners are exposed under normal operating conditions.

Although leaf spring assemblies employing rubber liners, fibers and the like have been proposed in the past, experience has shown that these assemblies developed a tendency to produce squeaking after a period of operation. Exhaustive tests have shown that this characteristic resulted from surface migration of waxes and similar ingredients conventionally used in rubber processing. Therefore, in accordance with another feature of the invention, the liners 18 are extruded from a Butyl rubber compound in which no plasticizers, processing oils or waxes are employed. The resulting liner has been found to retain all of the desirable physical characteristics of Butyl rubber, while eliminating objectionable squeaking previously experienced where conventional rubber compounds were employed.

By way of example, and for the purposes of definition, the Butyl rubber compound referred to herein may be the well known copolymer of isobutylene and isoprene. A specific example of the Butyl leaf spring liners employed in the present invention is a composition which is a mix consisting of the following ingredients in the proportions indicated by weight.

| | Parts |
|---|---|
| Isobutylene isoprene | 100 |
| Zinc oxide | 5 |
| Sulphur | 1½–2 |
| Benzothiazyl disulphide (Altax) | 1 |
| Copper dimethyldithiocarbamate (Cumate) | 1–1½ |
| Carbon black (channel black or F. E. F.) | 60–70 |

It is also important to note that the present invention contemplates the use of Butyl rubber liners which extend throughout the full length of the lower adjacent spring leaf. In this connection it has been found that axle vibration produces standing waves in the spring leaves which when properly damped significantly reduced noise transmitted to the vehicle body. It was also determined that the location of the standing waves so produced varied according to the frequency of the wave. Consequently, localized damping such as provided by buttons and other forms of leaf spring inserts were effective only with respect to a given frequency. However, by providing an uninterrupted full length liner, full damping of standing waves results regardless of variation in frequency of axle vibration.

From the foregoing, it will be seen that a novel and improved leaf spring assembly has been provided which utilizes resilient full length liners possessing physical characteristics capable of substantially reducing road noise transmission without significantly altering the the theoretical characteristics of leaf spring assemblies. The liners employed in the present invention are not only highly effective, but in addition are so formed as to lend themselves admirably to rapid production and assembly.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. A leaf spring assembly for a vehicle comprising a plurality of stacked spring leaves, certain of said leaves having a parabolic curvature on one surface thereof, and a plurality of wax free Butyl rubber strips disposed alternately between said leaves, each of said strips being at least as long as the lower adjacent spring leaf, said strips being formed by continuous extrusion and having parallel marginal ribs formed on one surface thereof, said ribs being inclined in cross section to compressibly conform with the said parabolic curvature of said leaves.

2. A liner member adapted for insertion between adjacent leaves of a leaf spring assembly, said liner being formed entirely of wax free Butyl rubber.

3. A leaf spring assembly comprising a plurality of vertically stacked spring leaves of uniform width but progressively varying length, a plurality of wax free Butyl rubber liners disposed between said spring leaves, each of said liners being of uniform width corresponding to the width of said leaves and of varying length corresponding with the length of the lower adjacent spring leaf, whereby said liners may be fabricated by continuous extrusion of a single configuration.

References Cited in the file of this patent

UNITED STATES PATENTS

| 1,589,092 | Barefoot | June 15, 1926 |
| 2,052,062 | Wallace | Aug. 25, 1936 |
| 2,356,128 | Thomas | Aug. 22, 1944 |
| 2,649,296 | Dow | Aug. 18, 1953 |
| 2,735,813 | Denman | Feb. 21, 1956 |

FOREIGN PATENTS

| 652,269 | Great Britain | Apr. 18, 1951 |